US010814421B2

(12) United States Patent
Goller et al.

(10) Patent No.: US 10,814,421 B2
(45) Date of Patent: Oct. 27, 2020

(54) METHODS OF FORMING OBJECTS BY DIFFUSION WELDING OF FOILS (71) Applicant: CORNING INCORPORATED, Corning, NY (US)

(72) Inventors: Martin Herbert Goller, Campbell, NY (US); David Myron Lineman, Painted Post, NY (US)

(73) Assignee: Corning Incorporated, Corning, NY (US)

(*) Notice: Subject to any disclaimer, the term of this patent is extended or adjusted under 35 U.S.C. 154(b) by 70 days.

(21) Appl. No.: 16/098,487

(22) PCT Filed: May 3, 2017

(86) PCT No.: PCT/US2017/030710
§ 371 (c)(1),
(2) Date: Nov. 2, 2018

(87) PCT Pub. No.: WO2017/192636
PCT Pub. Date: Nov. 9, 2017

(65) Prior Publication Data
US 2019/0151979 A1 May 23, 2019

Related U.S. Application Data (60) Provisional application No. 62/332,718, filed on May 6, 2016.

(51) Int. Cl.
*B23K 20/00* (2006.01)
*B23K 20/02* (2006.01)
(Continued)

(52) U.S. Cl.
CPC .......... *B23K 20/021* (2013.01); *B23K 20/233* (2013.01); *B23K 20/24* (2013.01);
(Continued)

(58) Field of Classification Search
CPC .. B23K 20/04; B23K 2101/001; B23K 13/01; B23K 15/0093; B23K 20/002;
(Continued)

(56) References Cited

U.S. PATENT DOCUMENTS 1,594,526 A  8/1926 Hume
1,688,078 A  10/1928 Hawley
(Continued)

FOREIGN PATENT DOCUMENTS

CN  201427924 Y  3/2010
JP  52012557 A  1/1977
(Continued)

OTHER PUBLICATIONS

Buzzard et al; "Tensile Properties From Room Temperature to 1315° C. of Tungsten-Lined Tantalum-Alloy (T-111) Tubing Fabricated by Hot Isostatic Pressing"; NASA Technical Memorandum; Feb. 1974; 21 Pages.
(Continued)

*Primary Examiner* — Erin B Saad
(74) *Attorney, Agent, or Firm* — Ryan T. Hardee (57) ABSTRACT

A first method of forming an object (400) includes wrapping foil around a preform (305) to provide a multi-layered structure including a plurality of layers of wrapped foil, and diffusion bonding the plurality of layers and the preform (305) together to form the object (400). A second method of forming an object includes wrapping foil around a preform (305) to provide a multi-layered structure comprising a plurality of layers of wrapped foil, removing the preform (305) from the multi-layered structure, and diffusion bonding the plurality of layers together to form the object (400). A third method of forming an object includes stacking a plurality of layers of foil to provide a multi-layered structure, diffusion bonding the plurality of layers together, and
(Continued)

shaping the diffusion bonded multi-layered structure to form the object (400).

24 Claims, 7 Drawing Sheets

(51) Int. Cl.
  *B23K 20/233* (2006.01)
  *B23K 20/24* (2006.01)
  *B23K 101/04* (2006.01)
  *B23K 103/08* (2006.01)
  *B23K 101/16* (2006.01)
  *B23K 103/00* (2006.01)

(52) U.S. Cl.
  CPC ...... *B23K 2101/04* (2018.08); *B23K 2101/16* (2018.08); *B23K 2103/08* (2018.08); *B23K 2103/50* (2018.08)

(58) Field of Classification Search
  CPC .... B23K 20/02; B23K 20/021; B23K 20/023; B23K 20/16; B23K 20/233; B23K 2103/08; B23K 2103/18; B23K 31/027; B23K 35/005; B23K 35/32
  See application file for complete search history.

(56) References Cited

U.S. PATENT DOCUMENTS

| | | | |
|---|---|---|---|
| 2,954,803 A | 10/1960 | Barnes et al. | |
| 3,773,589 A * | 11/1973 | Kaiser | B21D 51/2676 156/218 |
| 4,762,268 A * | 8/1988 | Doble | B23K 20/04 228/186 |
| 4,980,126 A | 12/1990 | Juhas | |
| 4,995,550 A | 2/1991 | Appl et al. | |
| 4,997,125 A * | 3/1991 | Glerum | B65D 3/22 220/62.11 |
| 5,601,892 A | 2/1997 | McIntosh | |
| 8,114,188 B1 | 2/2012 | Goller et al. | |
| 8,434,329 B2 | 5/2013 | Singer | |
| 2005/0035183 A1 | 2/2005 | Beckford | |
| 2011/0143162 A1 | 6/2011 | Merrill et al. | |
| 2012/0180529 A1 | 7/2012 | Singer | |
| 2015/0003191 A1 | 1/2015 | Takagi et al. | |
| 2015/0107306 A1 | 4/2015 | Goller et al. | |
| 2017/0291840 A1 | 10/2017 | Goller | |

FOREIGN PATENT DOCUMENTS

| | | |
|---|---|---|
| JP | 3241417 B2 | 12/2001 |
| JP | 2004034125 A | 2/2004 |
| JP | 2005035183 A | 2/2005 |
| JP | 2009233671 A | 10/2009 |
| KR | 2015049044 A | 5/2015 |

OTHER PUBLICATIONS

Corti; "The 28th Santa Fe Symposium on Jewelry Manufacturing Technology"; Johnson Matthey Technol. Rev., 2014, 58 (4); pp. 189-194.

International Search Report and Written Opinion of the International Searching Authority; PCT/US2017/030710; dated Aug. 9, 2017; 12 Pages; European Patent Office.

* cited by examiner

METHODS OF FORMING OBJECTS BY DIFFUSION WELDING OF FOILS

CROSS-REFERENCE TO RELATED APPLICATIONS

This application claims the benefit of priority under 35 U.S.C. § 371 of International Patent Application Serial No. PCT/US2017/030710, filed on May 3, 2017, which in turn, claims the benefit of priority of U.S. Provisional Patent Application Ser. No. 62/332,718 filed on May 6, 2016, the contents of each of which are relied upon and incorporated herein by reference in their entireties.

FIELD

The present disclosure relates generally to methods for forming an object and, more particularly, to methods for forming an object from a plurality of layers of foil by diffusion bonding.

BACKGROUND

It is known to process glass with a glass processing apparatus that can include various objects. It is further known to form a glass ribbon from a quantity of molten material with a glass manufacturing apparatus that can include various objects.

SUMMARY

The following presents a simplified summary of the disclosure in order to provide a basic understanding of some exemplary embodiments described in the detailed description.

In some embodiments, a method of forming an object can include wrapping foil around a preform to provide a multi-layered structure including a plurality of layers of wrapped foil, and diffusion bonding the plurality of layers and the preform together to form the object.

In some embodiments, a method of forming an object can include wrapping foil around a preform to provide a multi-layered structure including a plurality of layers of wrapped foil, removing the preform from the multi-layered structure, and diffusion bonding the plurality of layers together to form the object.

In some embodiments, the multi-layered structure can include an inner dimension and a wall thickness, where the inner dimension is based at least in part on an outer dimension of the preform, and where the wall thickness is based at least in part on a thickness of the foil and the number of layers wrapped around the preform, and the multi-layered structure can include at least two sections each including a different wall thickness.

In some embodiments, a method of forming an object can include stacking a plurality of layers of foil to provide a multi-layered structure, diffusion bonding the plurality of layers together, and then shaping the diffusion bonded multi-layered structure to form the object.

In some embodiments, the method can include diffusion bonding a plurality of diffusion bonded multi-layered structures together prior to shaping.

In some embodiments, the method can include diffusion bonding another diffusion bonded multi-layered structure to the object.

In some embodiments, the object can include an enclosure including two opposing walls that extend from an opening in a direction, where a width of each of the two opposing walls increases relative to the opening along the direction, and where a distance between the two opposing walls decreases along the direction to provide an elongated slot opposite the opening.

In some embodiments, the method can include attaching a tank to the elongated slot of the enclosure.

In some embodiments, the method can include attaching an inlet of an extender to the elongated slot of the enclosure, where the extender includes a hollow interior defining a rectangular wall extending from the inlet of the extender to an outlet of the extender.

In some embodiments, shaping can include shaping the diffusion bonded multi-layered structure around a preform to form the object.

In some embodiments, diffusion bonding can include a hot isostatic pressing process.

In some embodiments, the foil can include a platinum or platinum alloy material.

In some embodiments, the preform can include a refractory material.

In some embodiments, the refractory material can include at least one of platinum, molybdenum alloys, alumina, zirconia, refractory oxides, and refractory nitrides.

In some embodiments, the preform can include a mandrel.

In some embodiments, the mandrel can include a hollow cylinder.

The above embodiments are exemplary and can be provided alone or in any combination with any one or more embodiments provided herein without departing from the scope of the disclosure. Moreover, it is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description, serve to explain the principles and operations thereof.

BRIEF DESCRIPTION OF THE DRAWINGS

These and other features, embodiments, and advantages of the present disclosure can be further understood when read with reference to the accompanying drawings.

DETAILED DESCRIPTION

Methods will now be described more fully hereinafter with reference to the accompanying drawings in which exemplary embodiments of the disclosure are shown. Whenever possible, the same reference numerals are used throughout the drawings to refer to the same or like parts. However, this disclosure may be embodied in many different forms and should not be construed as limited to the embodiments set forth herein.

Glass sheets are commonly fabricated by flowing molten glass to a forming body whereby a glass ribbon may be formed by a variety of ribbon forming processes including, float, slot draw, down-draw, fusion down-draw, up-draw, press roll or any other forming processes. The glass ribbon from any of these processes may then be subsequently divided to provide one or more glass sheets suitable for further processing into a desired application, including but not limited to, a display application. For example, the one or more glass sheets can be used in a variety of display applications, including liquid crystal displays (LCDs), electrophoretic displays (EPD), organic light emitting diode displays (OLEDs), plasma display panels (PDPs), or the like.

Figure 1:
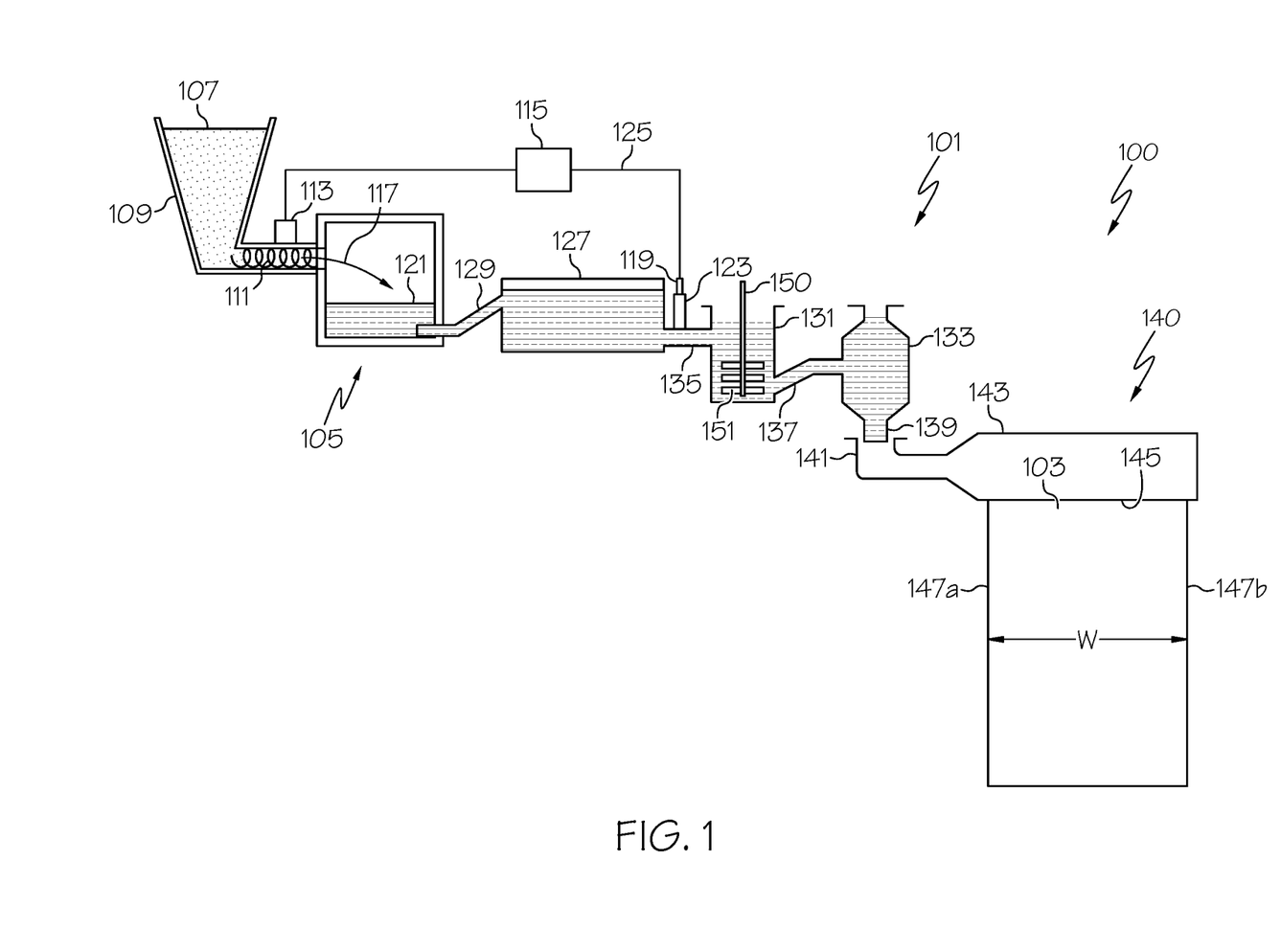
FIG. 1 illustrates a schematic view of an exemplary glass manufacturing apparatus in accordance with embodiments disclosed herein.

FIG. 1 schematically illustrates an exemplary glass manufacturing apparatus 101 to form a glass ribbon 103. The glass manufacturing apparatus 101 can operate to provide a method of processing glass (represented by numeral 100) that can, in some embodiments, include any one or more of the features of the glass manufacturing apparatus 101 disclosed herein. For illustration purposes, the glass manufacturing apparatus 101 is illustrated as a fusion down-draw apparatus, although other glass manufacturing apparatus for up-draw, float, press rolling, slot draw, etc. may be provided in further embodiments. As illustrated, the glass manufacturing apparatus 101 can include a melting vessel 105 oriented to receive batch material 107 from a storage bin 109. The batch material 107 can be introduced by a batch delivery device 111 powered by a motor 113. An optional controller 115 can be operated to activate the motor 113 to introduce a desired amount of batch material 107 into the melting vessel 105, as indicated by arrow 117. A glass melt probe 119 can be used to measure a level of molten material 121 within a standpipe 123 and communicate the measured information to the controller 115 by way of a communication line 125.

The glass manufacturing apparatus 101 can also include a fining vessel 127 located downstream from the melting vessel 105 and coupled to the melting vessel 105 by way of a first connecting conduit 129. In some embodiments, molten material 121 may be gravity fed from the melting vessel 105 to the fining vessel 127 by way of the first connecting conduit 129. For example, gravity may act to drive the molten material 121 to pass through an interior pathway of the first connecting conduit 129 from the melting vessel 105 to the fining vessel 127. Within the fining vessel 127, bubbles may be removed from the molten material 121 by various techniques.

The glass manufacturing apparatus 101 can further include a mixing chamber 131 that may be located downstream from the fining vessel 127. The mixing chamber 131 can be used to provide a homogenous composition of molten material 121, thereby reducing or eliminating inhomogeneity that may otherwise exist within the molten material 121 exiting the fining vessel 127. As shown, the fining vessel 127 may be coupled to the mixing chamber 131 by way of a second connecting conduit 135. In some embodiments, molten material 121 may be gravity fed from the fining vessel 127 to the mixing chamber 131 by way of the second connecting conduit 135. For instance, gravity may drive the molten material 121 to pass through an interior pathway of the second connecting conduit 135 from the fining vessel 127 to the mixing chamber 131.

The glass manufacturing apparatus 101 can further include a delivery vessel 133 that may be located downstream from the mixing chamber 131. The delivery vessel 133 can condition the molten material 121 to be fed into a glass former 140. For example, the delivery vessel 133 can function as an accumulator and/or flow controller to adjust and provide a consistent flow of molten material 121 to the glass former 140. As shown, the mixing chamber 131 may be coupled to the delivery vessel 133 by way of a third connecting conduit 137. In some embodiments, molten material 121 may be gravity fed from the mixing chamber 131 to the delivery vessel 133 by way of the third connecting conduit 137. For instance, gravity may drive the molten material 121 to pass through an interior pathway of the third connecting conduit 137 from the mixing chamber 131 to the delivery vessel 133.

As further illustrated, a delivery pipe 139 can be positioned to deliver molten material 121 to the glass former 140 of the glass manufacturing apparatus 101. The glass former 140 may draw the molten material 121 into the glass ribbon 103 off of a root 145 of a forming vessel 143. In the illustrated embodiment, the forming vessel 143 can be provided with an inlet 141 oriented to receive molten material 121 from the delivery pipe 139 of the delivery vessel 133. In some embodiments, the forming vessel 143 can include a trough oriented to receive the molten material 121 from the inlet 141. The forming vessel 143 can further include a forming wedge including a pair of downwardly inclined converging surface portions extending between opposed ends of the forming wedge. In some embodiments, the molten material 121 can flow from the inlet 141 into the trough of the forming vessel 143. The molten material 121 can then overflow from the trough by simultaneously flowing over corresponding weirs and downward over the outer surfaces of the corresponding weirs. Respective streams of molten material 121 then flow along the downwardly inclined converging surface portions of the forming wedge to be drawn off the root 145 of the forming vessel 143, where the flows converge and fuse into the glass ribbon 103. The glass ribbon 103 may then be fusion drawn off the root 145 with a width "W" of the glass ribbon 103 extending between a first vertical edge 147a of the glass ribbon 103 and a second vertical edge 147b of the glass ribbon 103.

In some embodiments, a thickness of the glass ribbon 103 defined between a first major surface and a second major surface of the glass ribbon 103 can be, for example, from about 40 micrometers (μm) to about 1 millimeter (mm), for example, from about 40 micrometers to about 0.5 millimeters, for example, from about 40 micrometers to about 500 micrometers, for example, from about 40 micrometers to about 300 micrometers, for example, from about 40 micrometers to about 200 micrometers, for example, from about 40 micrometers to about 100 micrometers, or, for example, about 40 micrometers, although other thicknesses may be provided in further embodiments. In addition, the glass ribbon 103 can include a variety of compositions including but not limited to glass, ceramic, glass-ceramic, soda-lime glass, borosilicate glass, alumino-borosilicate glass, an alkali-containing glass, an alkali-free glass, or any combination thereof.

Methods of forming one or more objects from a plurality of layers of foil by diffusion bonding will now be described. Some exemplary objects may be provided herein with the understanding that methods of the disclosure can be implemented alone or in combination to form a variety of objects including objects not specifically disclosed herein. Accordingly, unless otherwise noted, the methods disclosed herein are intended to encompass methods of forming any object irrespective of at least one of a shape of the object and a size of the object. Moreover, any one or more of the objects formed by the methods disclosed herein can be employed in a variety of applications including applications involving molten material. For example, in some embodiments, any one or more of the objects provided herein can be employed in the method of processing glass 100 as well as in the glass manufacturing apparatus 101 disclosed herein. It is to be understood, however, that unless otherwise noted, the methods provided herein are intended to encompass methods of forming any object irrespective of a particular application in which the object may be employed.

In addition, unless otherwise noted, as used herein, diffusion bonding can refer to the process of solid state or steady state diffusion whereby atoms of two solid, metallic surfaces intersperse over time. For example, diffusion bonding can join similar or dissimilar metals without liquid fusion and without a filler material, adhesive, or bonding agent between the metallic surfaces to be joined. Accordingly, in some embodiments, diffusion bonding does not add weight to the process of joining metal and can result in a joint that includes the material properties of the base material. In addition, in some embodiments, diffusion bonding can provide a continuous joint that is indistinguishable from the base material. For example, diffusion bonding can provide a joint between at least two base metals that exhibits the strength and temperature characteristics of the base metal or metals.

The process of diffusion bonding can include abutting at least two surfaces that are to be joined. The two surfaces can be manufactured from any one or more metals, oxides, nitrides, and any other material capable of diffusion bonding. When the two surfaces initially contact, small surface defects (e.g., asperities) on the surfaces can undergo plastic deformation; and, as the surface defects deform, the defects can interlink and create an interface between the two surfaces. In some embodiments, diffusion bonding can occur under conditions that include high temperature and high pressure. In some embodiments, diffusion bonding can include a hot isostatic pressing (HIP) process, and, in some embodiments, the hot isostatic pressing process can include a canning process.

In some embodiments, a continuous, thin structure can be welded around the entire assembly to be diffusion bonded. The continuous, thin structure can be manufactured from any one or more metals, oxides, nitrides, and any other suitable material. If the assembly includes a hollow internal portion, the thin structure can be welded inside the assembly to enclose the entire assembly in the structure. The structure can be sealed vacuum-tight and a vacuum can then be drawn and maintained on the interior of the structure with the assembly sealed inside the structure. The vacuum-sealed structure with the entire assembly sealed inside can then be exposed to elevated temperature and elevated pressure. The elevated temperature and elevated pressure can cause accelerated creep in the materials of the assembly within the vacuum-sealed structure. Based at least on the accelerated creep, grain boundaries and raw material can migrate between the two surfaces and reduce gaps to form isolated pores. Additionally, while subjected to the elevated temperature and elevated pressure over a period of time, the materials can then begin to diffuse across the boundary of the abutting surfaces. Diffusion across the boundary can cause the material boundary between the two surfaces to blend and create a bond between the two metallic surfaces. Depending on the material properties of the assembly and the size of the assembly, the time, temperature, and pressure of the diffusion bonding process can be adjusted to obtain complete fusion between the metallic surfaces. After the assembly has bonded together, the vacuum-sealed structure can be removed by, for example, mechanical implements (e.g., machining) and/or by destruction with chemicals (e.g., acid). In some embodiments, the vacuum-sealed structure can include a material that is compatible with the assembly, and the vacuum-sealed structure can be maintained around the assembly after the assembly has bonded together. In some embodiments, the assembly and the vacuum-sealed structure can bond together when exposed to elevated temperature and elevated pressure to form a complete object that can then be employed in any one or more applications.

Figure 2:
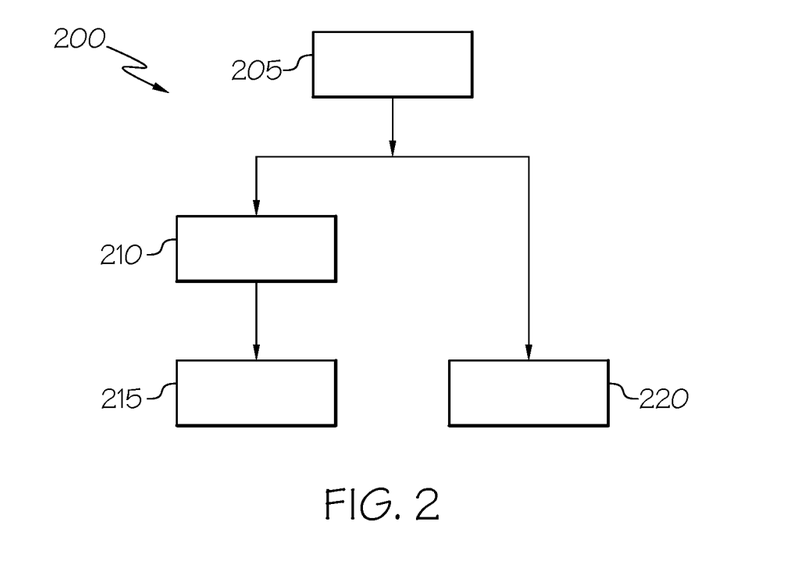
FIG. 2 shows a schematic flow chart illustrating methods of forming an object in accordance with embodiments disclosed herein.
Figure 3:
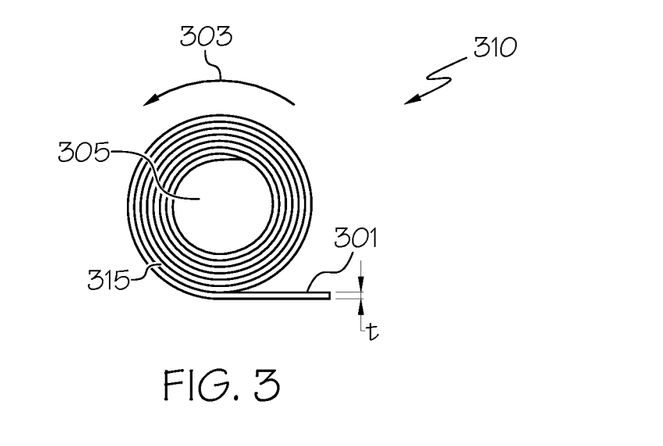
FIG. 3 illustrates a schematic view of an exemplary multi-layered structure including a plurality of layers of foil wrapped around a preform in accordance with embodiments disclosed herein.
Figure 4:
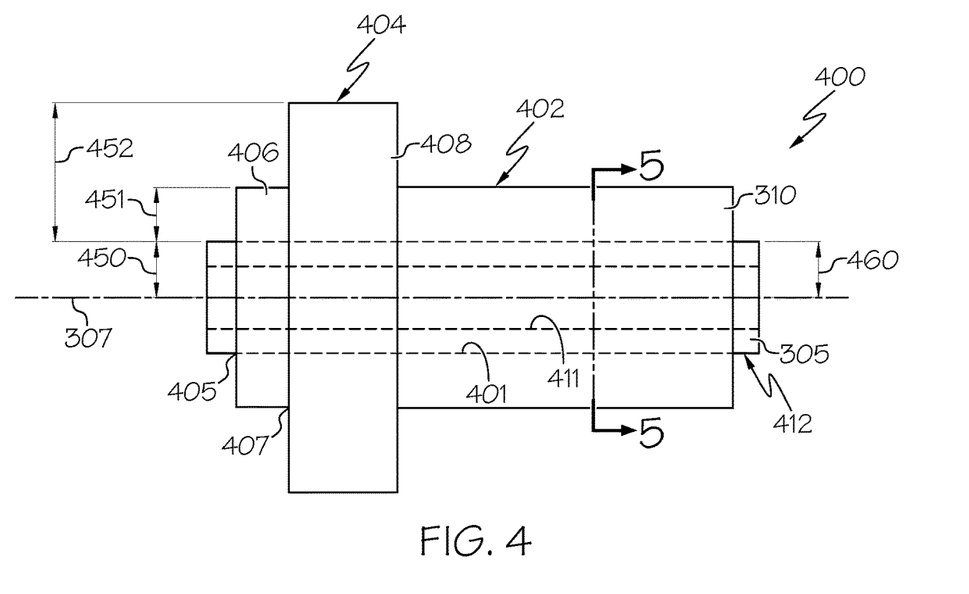
FIG. 4 illustrates a schematic view of an exemplary object formed from the multi-layered structure of FIG. 3 in accordance with embodiments disclosed herein.

As shown in FIGS. 2-4, in some embodiments, a first method 200 (FIG. 2) of forming a first object 400 (shown in FIG. 4) can include a step 205 of wrapping foil 301 (shown in FIG. 3) around a preform 305 (e.g., as represented by arrow 303) to provide a first multi-layered structure 310 including a first plurality of layers 315 of wrapped foil 301. Unless otherwise noted, a foil 301 can include a thin sheet of metal. In some embodiments, the foil 301 can include a thickness "t" from about 0.1 mm to about 2 mm, for example, from about 0.1 mm to about 1.5 mm, for example, from about 0.25 mm to about 1 mm, for example, from about 0.25 mm to about 0.5 mm, including all ranges and subranges therebetween, although other thicknesses may be provided in some embodiments. The foil 301 can be thin and flexible and can be wrapped around the preform 305 to avoid wrinkles, folds, and tears in the foil 301. The preform 305 can be provided to support the first plurality of layers 315 of foil 301 during the wrapping process. In some embodiments, a single, continuous piece of foil 301 can be wrapped around the preform 305 to provide a first multi-layered structure 310 with no seams between adjacent layers of the first plurality of layers 315 of foil 301. In some embodiments, a plurality of pieces of foil 301 can be connected (e.g., spot welded) together and wrapped around the preform 305.

In some embodiments, the foil 301 can include a platinum or platinum alloy material. In some embodiments, the foil 301 can be produced from metal powders using a powder metallurgy process. In some embodiments, the foil 301 can include oxide dispersion strengthened alloys. Additionally, in some embodiments, the foil 301 can be produced by rolling, pressing, drawing and other mechanical processes to form a thin sheet. Likewise, in some embodiments, foils of different materials can be wrapped around the preform 305 to provide, for example, alternating layers of material. In some embodiments a first material can form inner layers of the first multi-layered structure 310 and a second material can form outer layers of the first multi-layered structure 310. For example, the first material can include a stronger, less oxidation resistant material (e.g., platinum rhodium alloy, platinum iridium, PTRh 90/10, PTRh 80/20), and the second material can include (relative to the first material) a more oxidation resistant, glass compatible material (e.g., oxide dispersion strengthened alloys, including nickel alloys, iron alloys, aluminum alloys, and steel alloys). In some embodiments, the first material can include a fiber reinforced material that provides strength in high temperature environments but that is incompatible with, for example, molten material, including molten glass. Thus, in applications where an outer surface of the object may be exposed to extreme conditions (e.g., heat, corrosion, etc.), a suitable material can be applied to an exterior of the object to withstand the extreme conditions. In some embodiments, the foil 301 may have different strength properties in a transverse and longitudinal direction. Accordingly, in some embodiments, the foil 301 can be wrapped around the preform 305 taking into account the orientation of the material properties of the foil 301. For example, in some embodiments, the foil 301 can be wrapped around the preform 305 such that the strongest direction of material strength of the foil 301 is aligned with the highest stress that may be imparted on the first object 400. Alternatively, in some embodiments, the foil 301 can be wrapped around the preform 305 such that the strongest direction of material strength of the foil 301 is oriented and varied to increase strength of the first object 400 in all directions.

Unless otherwise noted, however, the material properties of the foil 301 are not intended to limit the disclosure. Accordingly, any material that can be provided as a thin sheet of foil 301 capable of diffusion bonding is to be considered within the scope of the disclosure including materials not explicitly disclosed herein. Based at least in part on a particular application in which the first object 400 is to be employed, suitable material from which the foil 301 is manufactured can be selected to provide specific material properties and characteristics as well as to control cost of the first object 400.

The methods of the disclosure can provide several advantages over traditional methods. In particular, some traditional methods of forming an object may include boring, drawing, rolling, and machining an object from an ingot. These traditional methods can be limited based at least in part on the initial size and weight of the ingot, the capabilities of casting equipment, wasted material from boring the ingot, equipment available for handling the ingot, and contamination risk from carbon, lubricants, and other substances used during the traditional methods of forming an object. Advantageously, the foil used to form the objects of the disclosure can be cleaned to remove undesirable contaminants more easily than ingots and thicker components can be cleaned. In addition, the methods of forming an object disclosed herein can reduce wasted material by, in some embodiments, allowing direct forming of a final shape of the object with the material without discarding any material during the forming process. In some embodiments, machining or finishing of the object can be performed after the object is formed; however, unlike some tradition methods, the methods of the disclosure can form the object to include a shape that is dimensionally similar to the desired final shape. Accordingly, time for performing subsequent machining or finishing processes can be decreased and the amount of material removed from the formed object to obtain the final shape of the object can be reduced. In some embodiments, because the object can be formed from high quality, expensive materials, reducing waste of the material can provide significant cost savings. Accordingly, the methods of forming objects disclosed herein are not limited by the size of, for example, an ingot from which an object may be formed. Rather, any object of any size can be formed with the methods disclosed herein by, for example, adding additional layers of foil (e.g., layer by layer) until the desired size and shape of the multi-layered structure are achieved. The methods disclosed herein, therefore, provide flexibility with respect to scaling a size of an object and can additionally form objects including various complex shapes that traditional methods cannot achieve.

Turning back to the right-hand side of FIG. 2, the first method 200 can include a step 220 of diffusion bonding the first plurality of layers 315 and the preform 305 together to form the first object 400. For example, as illustrated in FIG. 4, the first object 400 can include the first multi-layered structure 310 wrapped around the preform 305 and diffusion bonded to the preform 305 at a first joint 405. The first joint 405 can extend between the preform 305 and the first multi-layered structure 310 at locations where the preform 305 and the first multi-layered structure 310 contact each other during the diffusion bonding process. The preform 305 can include a preform outer surface 412 around which the foil 301 can be wrapped. Accordingly, the first multi-layered structure 310 can include an inner surface 401 including the foil 301 that abuts the preform outer surface 412, and a first outer surface 402 of the first multi-layered structure 310 can include the foil 301 and can define an outermost surface of the first object 400.

In some embodiments, the first method 200 of forming a first object 400 can include the step 205 of wrapping foil 301 around the preform 305 to provide the first multi-layered structure 310 including the first plurality of layers 315 of wrapped foil 301. Additionally, as shown on the left-hand side of FIG. 2, the first method 200 can include a step 210 of removing the preform 305 from the first multi-layered structure 310, and the step 215 of diffusion bonding the first plurality of layers 315 to form the first object 400. For example, the preform 305 can be removed from the first multi-layered structure 310 prior to the step 215 of diffusion bonding, and then the first plurality of layers 315 can be diffusion bonded together to form the first object 400. When the preform 305 is removed from the first multi-layered structure 310 prior to the step 215 of diffusion bonding, the preform 305 can be provided to support the foil 301 and define a shape to which the foil 301 can conform. Likewise, when the preform 305 is removed from the first multi-layered structure 310 prior to the step 215 of diffusion bonding, the material from which the preform 305 is manufactured does not need to be compatible with diffusion bonding techniques nor does the material from which the preform 305 is manufactured need to be compatible with the strength and material properties of objects exposed to various loading conditions from environments in which the first object 400 may be employed.

FIG. 4 represents the diffusion bonded first object 400 with the preform 305 schematically illustrated in dashed lines to represent embodiments where the first multi-layered structure 310 is diffusion bonded to the preform 305 (e.g., step 220) as well as embodiments where the preform 305 is removed from the first multi-layered structure 310 (e.g., step 210) and the first multi-layered structure 310 is diffusion bonded (e.g., step 215). As shown, in some embodiments, the first multi-layered structure 310 can include an inner dimension 450 defined between a centerline 307 of the first multi-layered structure 310 and the inner surface 401 of the first multilayered structure 310. The first multi-layered structure 310 can also include a first wall thickness 451 defined between the inner surface 401 of the first multi-layered structure 310 and the first outer surface 402 of the first multi-layered structure 310. Accordingly, the inner dimension 450 can be based at least in part on a preform outer dimension 460, and the first wall thickness 451 can be based at least in part on a thickness "t" of the foil 301 and the number of the first plurality of layers 315 wrapped around the preform 305. In some embodiments, the inner dimension 450 of the first multi-layered structure 310 can equal the preform outer dimension 460.

In some embodiments, the first multi-layered structure 310 can include at least two sections (e.g., first section 406, second section 408), each including a different corresponding wall thickness (e.g., first wall thickness 451, second wall thickness 452). For example, in some embodiments, the first section 406 of the first multi-layered structure 310 can include the first plurality of layers 315 of foil 301 wrapped around the preform 305, and the second section 408 of the first multi-layered structure 310 can include additional layers of foil 301 wrapped around the first outer surface 402 of the first section 406 of the first multi-layered structure 310. The second section 408 can be diffusion bonded to the first section 406 at a second joint 407. The second section 408 can therefore include a second outer surface 404 that defines the second wall thickness 452 between the preform outer surface 412 and the second outer surface 404 of the second section 408 of the first multi-layered structure 310. The second wall thickness 452 can therefore be greater than the first wall thickness 451 of the first section 406 defined between the preform outer surface 412 and the first outer surface 402 of the first multi-layered structure 310. In some embodiments, the first multi-layered structure 310 can include any number of sections of different thicknesses. Accordingly, sections of different thickness can be provided at any location on the first multi-layered structure 310 to, for example, locally strengthen a section of the first object 400. Such process of locally strengthening the first object 400 not only provides a stronger section but also provides for efficient allocation of material by reducing the amount of material used in other sections of the first object 400 which may not require the added strength provided in the stronger section. Accordingly, because the first object 400 can be formed from high quality, expensive materials, in some embodiments, efficient allocation of material can provide significant cost savings.

Figure 5:
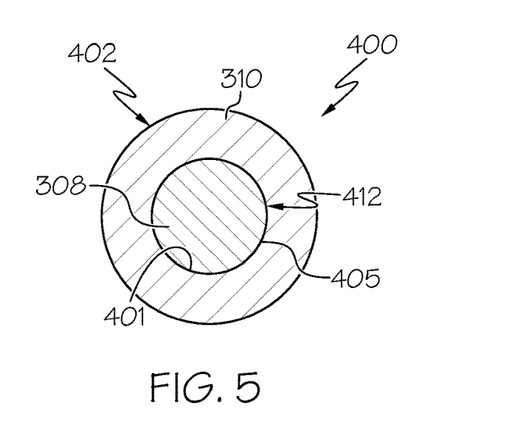
FIGS. 5-7 show exemplary cross-sectional views of the exemplary object along line 5-5 of FIG. 4.

As shown in FIG. 5, in some embodiments, the preform 305 can include a mandrel 308 and the diffusion bonded first joint 405 can extend around a periphery of the mandrel 308 along a length of the mandrel 308 bonding the preform outer surface 412 of the mandrel 308 to the inner surface 401 of the first multi-layered structure 310. The first multi-layered structure 310 and the mandrel 308 can be bonded together to form a solid first object 400 with an outermost surface of the solid first object 400 including the first outer surface 402 of the first multi-layered structure 310 which includes the foil 301. In some embodiments, the mandrel 308 can include a cross-sectional profile having any shape, including but not limited to, circular, oval, square, rectangular, triangular, and any other geometric, prismatic, or polygonal shape. In addition, the mandrel 308 can be solid or hollow, in some embodiments.

Figure 6:
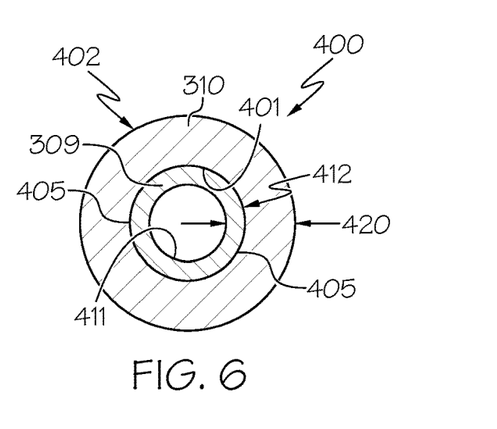

For example, as shown in FIG. 6, in some embodiments, the mandrel 308 can include a hollow cylinder 309. In some embodiments, the hollow cylinder 309 can include a cross-sectional profile having any shape, including but not limited to, circular (as illustrated), oval, square, rectangular, triangular, and any other geometric, prismatic, or polygonal shape. The diffusion bonded first joint 405 can extend around a periphery of the hollow cylinder 309 along a length of the hollow cylinder 309 bonding the preform outer surface 412 of the hollow cylinder 309 to the inner surface 401 of the first multi-layered structure 310. The first multi-layered structure 310 and the hollow cylinder 309 can be bonded together to form a hollow first object 400 with an outermost surface of the hollow first object 400 including the first outer surface 402 of the first multi-layered structure 310 which includes the foil 301 and an innermost surface of the hollow first object 400 including a preform inner surface 411 defined by an interior of the hollow cylinder 309. Accordingly, in some embodiments, a thickness 420 of the hollow first object 400 can be defined between the preform inner surface 411 of the hollow cylinder 309 and the first outer surface 402 of the first multi-layered structure 310 and can correspond to the number of the first plurality of layers 315 of foil 301 multiplied by a thickness "t" of the foil 301 plus a thickness of a wall of the hollow cylinder 309.

In some embodiments, the preform 305 can include a refractory material. In some embodiments, the refractory material can include at least one of platinum, molybdenum alloys, alumina, zirconia, refractory oxides, and refractory nitrides. In some embodiments, the preform 305 can include an object formed from the methods disclosed herein, and the first plurality of layers 315 of foil 301 can be wrapped around the preform 305 to create the first multi-layered structure 310. By bonding the first multi-layered structure 310 to the preform 305, the first object 400 can be formed from, for example, an existing structure with a first plurality of layers 315 of foil 301 added to the existing structure to increase strength of the existing structure, alter a shape of the existing structure, etc. Accordingly, because the first object 400 can be formed from high quality, expensive materials, forming objects by modifying existing structures (e.g., rather than forming entirely new objects) can reduce the amount of new material that is used and can provide significant cost savings.

Figure 7:
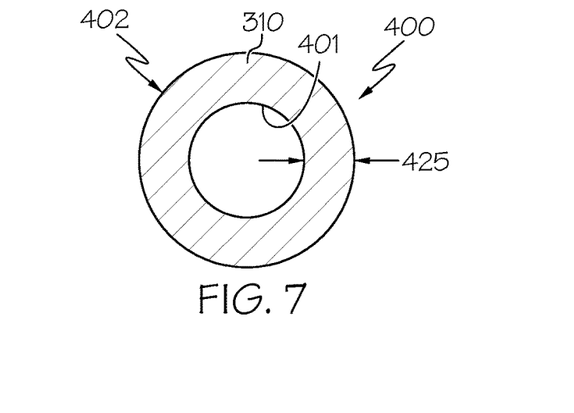

As illustrated in FIG. 7, when the preform 305 is removed from the first multi-layered structure 310 prior to the step 215 of diffusion bonding, the resulting first object 400 formed when the first plurality of layers 315 of foil 301 are diffusion bonded together can include an innermost surface that includes the inner surface 401 of the first multi-layered structure 310 which includes the foil 301 and an outermost surface that includes the first outer surface 402 of the first multi-layered structure 310 which also includes the foil 301. Accordingly, in some embodiments, a thickness 425 of the first object 400 can be defined between the inner surface 401 of the first multi-layered structure 310 and the first outer surface 402 of the first multi-layered structure 310 and can correspond to the number of the first plurality of layers 315 of foil 301 wrapped around the preform 305 multiplied by a thickness "t" of the foil 301.

In some embodiments, the first object 400 can be employed as a stir shaft 150, as shown in FIG. 1, to mix molten material 121 within the mixing chamber 131 of the glass manufacturing apparatus 101. Moreover, in some embodiments, additional layers of foil 301 can be added at selected locations on the stir shaft 150 to provide stronger sections of increased thickness that can withstand, for example, higher applied torque. Likewise, in some embodiments, additional layers of foil 301 can be added on the stir shaft 150 to provide a section onto which stir blades 151 can be attached. The first object 400 can be employed in other locations within the glass manufacturing apparatus 101 and within the method of processing glass 100, including but not limited to, embodiments including flow needles, rods, and other embodiments that employ a solid or hollow shaft that may or may not be exposed to molten material.

Figure 8:
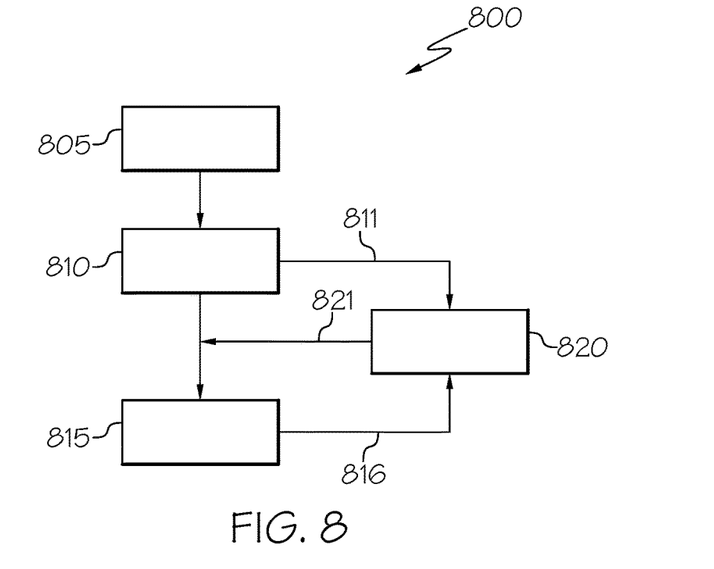
FIG. 8 shows a schematic flow chart illustrating additional methods of forming an object in accordance with embodiments disclosed herein.
Figure 9:
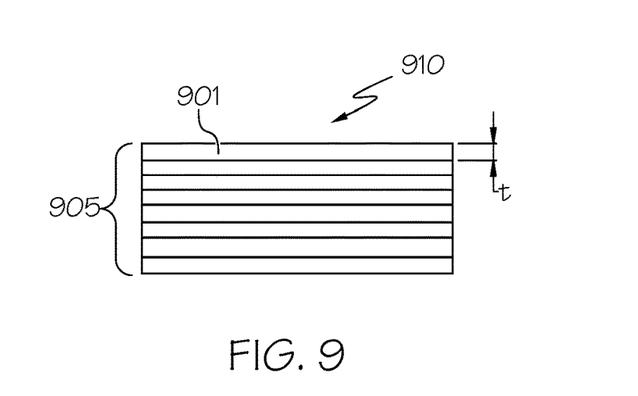
FIG. 9 illustrates a schematic view of an exemplary multi-layered structure including a plurality of layers of foil that are stacked in accordance with embodiments disclosed herein.
Figure 10:
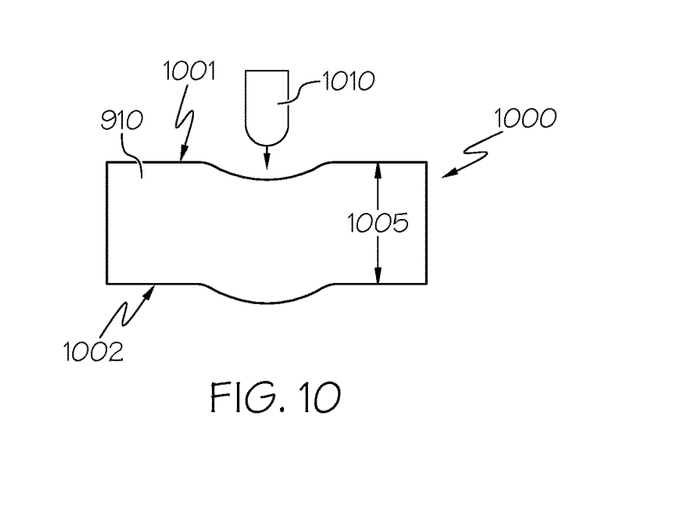
FIG. 10 illustrates a schematic view of an exemplary object formed from the multi-layered structure of FIG. 9 in accordance with embodiments disclosed herein

As shown in FIGS. 8-10, in some embodiments, a second method 800 of forming a second object 1000 can include a step 805 of stacking a second plurality of layers 905 of foil 901 to provide a second multi-layered structure 910 (shown in FIG. 9). The second method 800 can include a step 810 of diffusion bonding the second plurality of layers 905 together, and a step 815 of shaping the diffusion bonded second multi-layered structure 910 to form the second object 1000 (shown in FIG. 10). The second object 1000 can include a thickness 1005 defined between a first outer surface 1001 and a second outer surface 1002 of the second object 1000. The thickness of the second object 1000 can be based at least in part on the thickness "t" of the foil 901 multiplied by the number of second plurality of layers 905 of foil 901. Each of the first outer surface 1001 and the second outer surface 1002 of the second object 1000 can include the foil 901. It is to be understood that foil 901 can include the same, similar, or different properties as the foil 301 disclosed herein and can, likewise, provide objects (e.g., second object 1000) that can achieve the same, similar, or different, advantages as first object 400 disclosed herein and that can be employed in the same, similar, or different applications disclosed herein. Accordingly, any one or more features of the first method 200 and the first object 400 can be employed either alone or in combination with any one or more of the features of the second method 800 and the second object 1000 to form any object from a plurality of layers of foil by diffusion bonding.

In some embodiments, as represented by tool 1010, the step 815 of shaping can include contacting the diffusion bonded second object 1000 with the tool 1010. In some embodiments, the tool 1010 can include a hammer, a press, a roller, and any other mechanical implement to impart a force on the second object 1000 to shape the second object 1000. In some embodiments, the tool 1010 can include a grinder, a blade, and any other mechanical implement to remove material from the second object 1000 to shape the second object 1000. In some embodiments, shaping can include shaping the diffusion bonded second multi-layered structure 910 around a preform to form the second object 1000. The preform can include features of the preform 305 disclosed herein as well as any other features (e.g., shape) around which the second multi-layered structure 910 can be shaped to provide the second object 1000.

Turning back to FIG. 8, in some embodiments, as represented by arrow 811, the second method 800 can include an additional step 820 of diffusion bonding a plurality of diffusion bonded multi-layered structures together prior to the step 815 of shaping. In some embodiments, the plurality of diffusion bonded multi-layered structures can include same, similar, or different features as the diffusion bonded second multi-layered structure 910. Likewise, in some embodiments, as represented by arrow 816, the second method 800 can include the additional step 820 of diffusion bonding another diffusion bonded multi-layered structure to the second object 1000 (e.g., after shaping 815). In some embodiments, the other diffusion bonded multi-layered structure can include same, similar, or different features as the diffusion bonded second multi-layered structure 910. As represented by arrow 821, after additional step 820 of diffusion bonding a plurality of diffusion bonded multi-layered structures together and/or diffusion bonding another diffusion bonded multi-layered structure to the second object 1000, the second method 800 can include the step 815 of shaping the structure provided from the additional step 820. In some embodiments, any one or more of the steps of the second method 800 can be repeated until a desired object is obtained.

Figure 11:
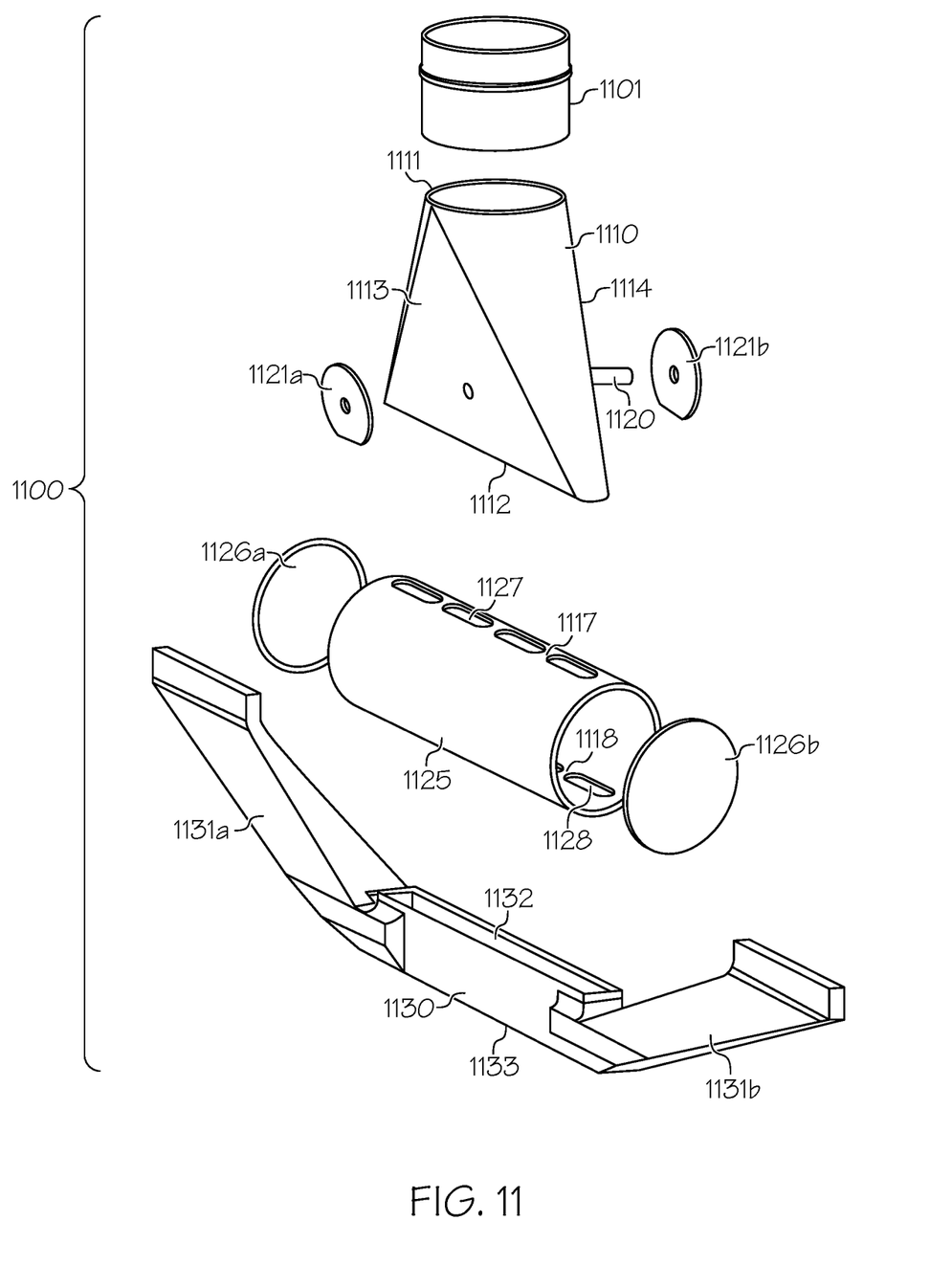
FIG. 11 illustrates a schematic exploded view of an exemplary object formed in accordance with the methods disclosed herein.
Figure 12:
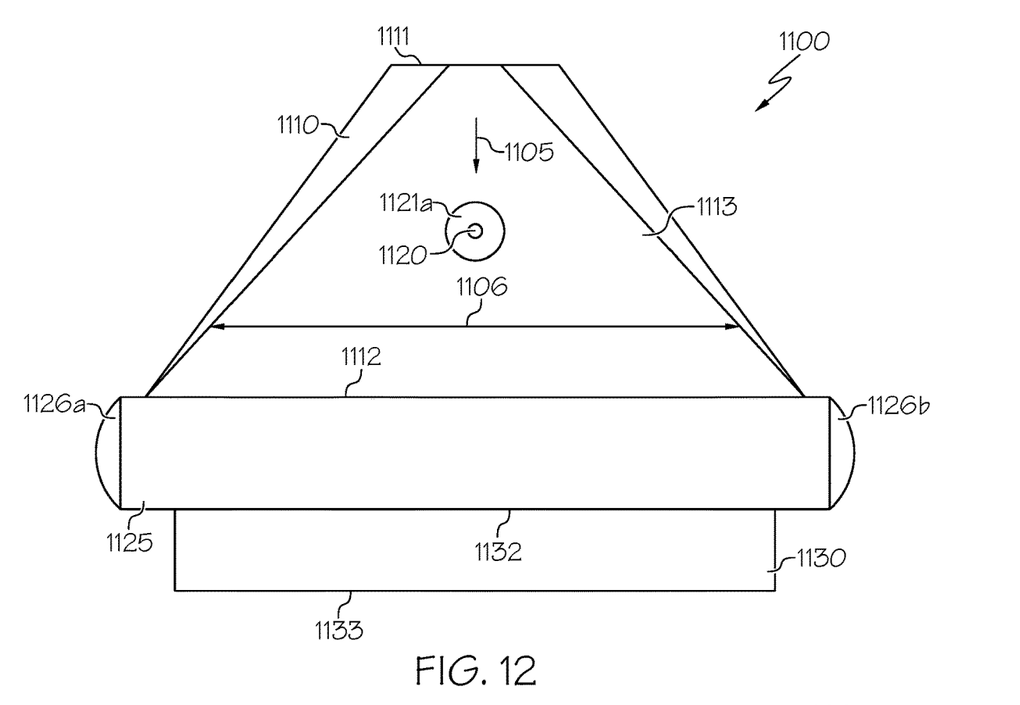
FIG. 12 illustrates a schematic front view of the exemplary object of FIG. 11.
Figure 13:
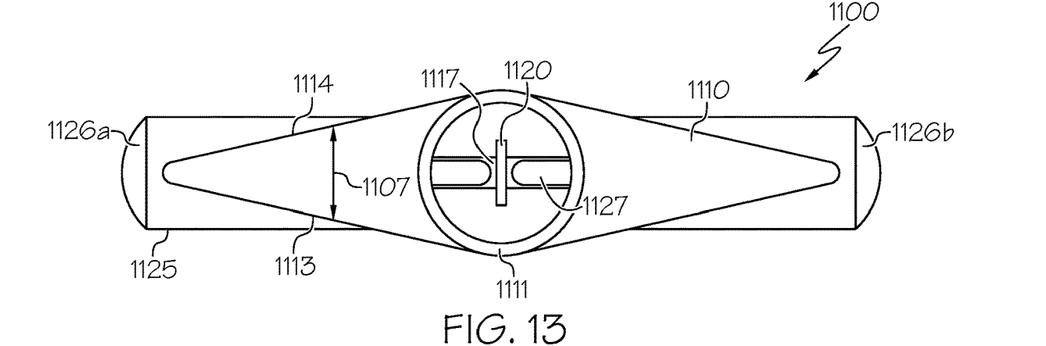
FIG. 13 illustrates a schematic top view of the exemplary object of FIG. 11.
Figure 14:
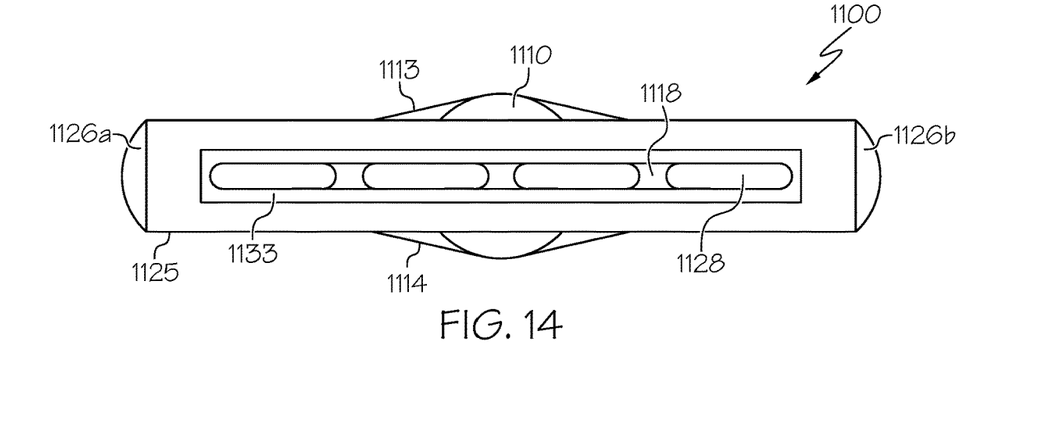
FIG. 14 illustrates a schematic bottom view of the exemplary composite object of FIG. 11.
Figure 15:
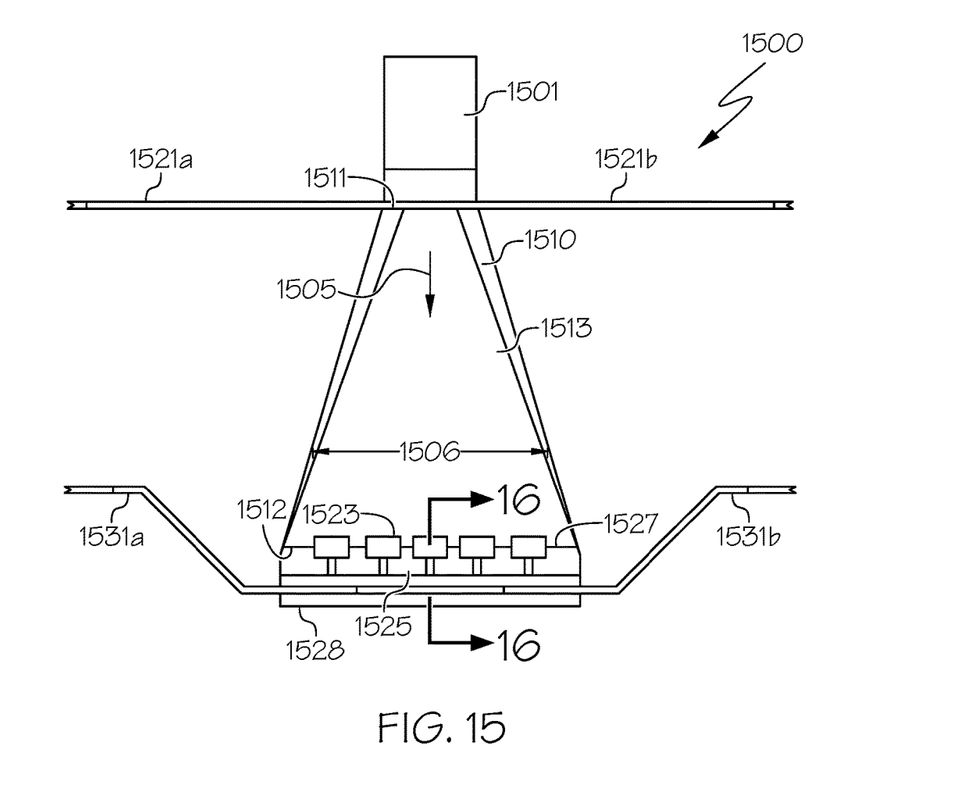
FIG. 15 illustrates a schematic front view of another exemplary object formed in accordance with the methods disclosed herein.
Figure 16:
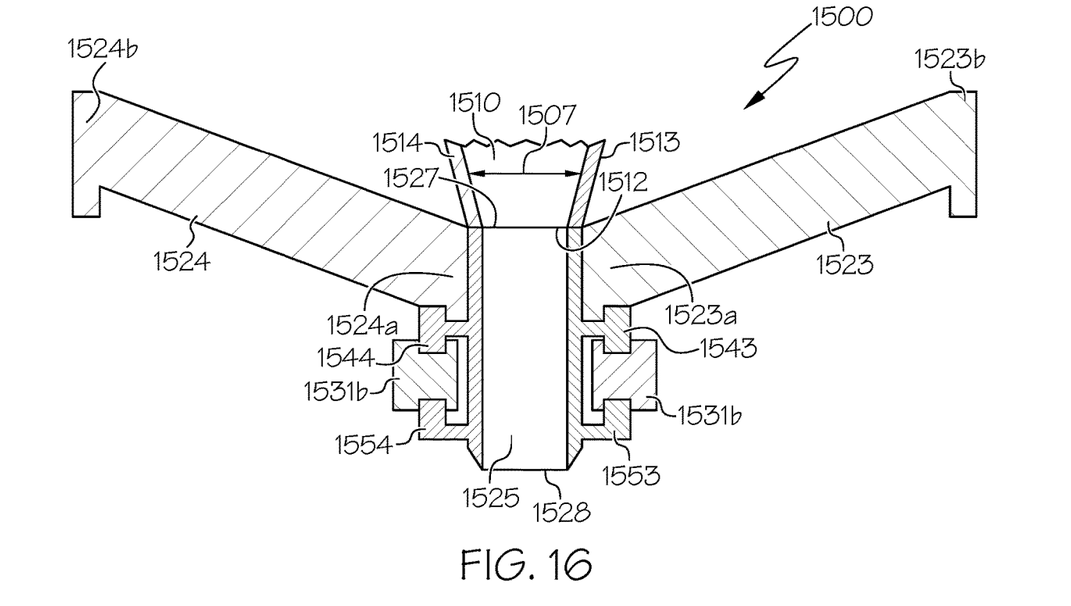
FIG. 16 shows a cross-sectional view of the other exemplary object along line 16-16 of FIG. 15.

For example, in some embodiments, as shown in FIGS. 11-16, any one or more objects (e.g., first object 400, second object 1000) formed by any of the methods disclosed herein can, alone or in combination, provide at least one of a third object 1100 (FIGS. 11-14) and a fourth object 1500 (FIGS. 15 and 16). As shown in FIG. 11, in some embodiments, the third object 1100 can include a first enclosure 1110 including two first opposing walls 1113, 1114 that extend from a first opening 1111 in a first direction 1105, as shown in FIG. 12. A first width 1106, perpendicular to the first direction 1105, of each of the two first opposing walls 1113, 1114 can increase relative to the first opening 1111 as the two first opposing walls 1113, 1114 extend from the first opening 1111 along the first direction 1105. Additionally, a first distance 1107 (FIG. 13) between the two first opposing walls 1113, 1114, perpendicular to the first direction 1105 and perpendicular to the first width 1106, can decrease as the two first opposing walls 1113, 1114 extend from the first opening 1111 along the first direction 1105 to provide a first elongated slot 1112 opposite the first opening 1111. Turning back to FIG. 11, a first pipe 1101 can be attached to the first opening 1111 of the first enclosure 1110 to extend the first opening 1111. In some embodiments, a first rod 1120 can extend between the two first opposing walls 1113, 1114 and can be secured with corresponding first fasteners 1121a, 1121b to maintain the first distance 1107 between the two first opposing walls 1113, 1114.

In some embodiments, a tank 1125 can be attached to the first elongated slot 1112 of the first enclosure 1110. The tank 1125 can include a tank inlet 1127 that can include a plurality of apertures separated by tank inlet supports 1117. The first elongated slot 1112 can circumscribe the tank inlet 1127. Likewise, on an opposite side of the tank 1125 from the tank inlet 1127, the tank 1125 can include a tank outlet 1128 that can include a plurality of apertures separated by tank outlet supports 1118. The tank 1125 can include a hollow interior extending between a pair of opposed end caps 1126a, 1126b that are attached to the tank 1125 at opposite ends of the tank 1125 to seal the tank 1125. In some embodiments, a lip 1130 can be attached to the tank 1125 and can include a lip inlet 1132 circumscribing the tank outlet 1128. The lip 1130 can include a rectangular wall extending from the lip inlet 1132 to a lip outlet 1133. Brackets 1131a, 1131b can be provided, in some embodiments, and can extend from the lip 1130 to secure the third object 1100 to a frame or other supporting structure (not shown).

In some embodiments, the third object 1100 can be employed to form glass (e.g., in a method of processing glass 100 including a glass manufacturing apparatus 101). For example, as shown in FIGS. 12-14 (with the first pipe 1101 and the brackets 1131a, 1131b removed for clarity), in some embodiments, molten material (e.g., molten material 121) can be provided to the first opening 1111 of the first enclosure 1110. The molten material can flow through the first enclosure 1110 between the two first opposing walls 1113, 1114 from the first opening 1111 to the first elongated slot 1112 with the molten material obtaining an elongated, narrow profile at the first elongated slot 1112. The molten material can then flow from the first elongated slot 1112 into the tank 1125 where the molten material can redistribute and spread within the tank 1125 to obtain a wide profile including an even pressure extending between the pair of opposed end caps 1126a, 1126b within the tank 1125. The molten material can then flow out of the tank 1125 with an even flow density to the lip 1130, and then through the lip 1130 from the lip inlet 1132 to the lip outlet 1133 to obtain a continuous, thin, elongated profile defined by the lip 1130. In some embodiments, rollers (not shown) can be provided at the lip outlet 1133 to draw the glass from the lip 1130 into a flexible glass ribbon.

As shown in FIG. 15, in some embodiments, the fourth object 1500 can include a second enclosure 1510 including two second opposing walls 1513, 1514 that extend from a second opening 1511 in a second direction 1505. A second width 1506, perpendicular to the second direction 1505, of each of the two second opposing walls 1513, 1514 can increase relative to the second opening 1511 as the two second opposing walls 1513, 1514 extend from the second opening 1511 along the second direction 1505. Additionally, a second distance 1507 (shown in FIG. 16) between the two second opposing walls 1513, 1514, perpendicular to the second direction 1505 and perpendicular to the second width 1506, can decrease as the two second opposing walls 1513, 1514 extend from the second opening 1511 along the second direction 1505 to provide a second elongated slot 1512 opposite the second opening 1511. Turning back to FIG. 15, a second pipe 1501 can be attached to the second opening 1511 of the second enclosure 1510 to extend the second opening 1511. Upper brackets 1521a, 1521b can be provided, in some embodiments, and can extend from the second pipe 1501 to secure the fourth object 1500 to a frame or other supporting structure (not shown). In some embodiments, an extender 1525 can be attached to the second elongated slot 1512 of the second enclosure 1510. The extender 1525 can include an extender inlet 1527, and the second elongated slot 1512 can be attached to the extender inlet 1527 to circumscribe the extender inlet 1527. Likewise, on an opposite side of the extender 1525 from the extender inlet 1527, the extender 1525 can include an extender outlet 1528. The extender 1525 can include a hollow interior defining a rectangular wall extending from the extender inlet 1527 to the extender outlet 1528.

In some embodiments, a plurality of opposing supports 1523, 1524 can be provided on opposite sides of the fourth object 1500 and can extend from the extender 1525 outward away from each of a corresponding one of the two second opposing walls 1513, 1514. A fixed end 1523a, 1524a of each of the plurality of opposing supports 1523, 1524 can be attached to the extender 1525 with a first portion of a fastener 1543, 1544. Likewise, an opposite cantilevered end 1523b, 1524b of each of the plurality of opposing supports 1523, 1524 can attach to a frame or other supporting structure (not shown) to support the extender 1525 and maintain a defined distance between the two second opposing walls 1513, 1514. For example, in some embodiments, the plurality of opposing supports 1523, 1524 can reduce effects that thermal expansion and creep may have on the extender 1525 by maintaining the rectangular walls of the extender 1525 in parallel relationship with each other from the extender inlet 1527 to the extender outlet 1528. In addition, the plurality of opposing supports 1523, 1524 can provide sufficient structural integrity to the extender 1525 and the enclosure 1510 such that internal supports (e.g., first rod 1120, tank inlet supports 1117, tank outlet supports 1118) may be omitted, in some embodiments.

In some embodiments, lower brackets 1531a, 1531b can be provided and can extend from the extender 1525 to secure the fourth object 1500 to a frame or other supporting structure (not shown). The lower brackets 1531a, 1531b can be secured to the extender 1525 with a second portion of a fastener 1553, 1554. As shown, in some embodiments, the first portion of the fastener 1543, 1544 and the second portion of the fastener 1553, 1554 can be provided in spaced relationship to each other to provide a clamp structure such that the first portion of the fastener 1543, 1544 and the second portion of the fastener 1553, 1554 can clamp around the respective lower brackets 1531a, 1531b to secure the lower brackets 1531a, 1531b to the extender 1525. Similar to the plurality of opposing supports 1523, 1524, in some embodiments, the first portion of the fastener 1543, 1544 and the second portion of the fastener 1553, 1554 can provide additional structural rigidity of the extender 1525 to reduce the impact that thermal expansion and creep may have on the extender 1525 by maintaining the rectangular walls of the extender 1525 in parallel relationship with each other from the extender inlet 1527 to the extender outlet 1528.

In some embodiments, the fourth object 1500 can be employed to form glass (e.g., in a method of processing glass 100 including a glass manufacturing apparatus 101). For example, in some embodiments, molten material (e.g., molten material 121) can be provided to the second opening 1511 of the second enclosure 1510. The molten material can flow through the second enclosure 1510 between the two second opposing walls 1513, 1514 from the second opening 1511 to the second elongated slot 1512 with the molten material obtaining an elongated, narrow profile at the second elongated slot 1512. The molten material can then flow from the second elongated slot 1512 through the extender inlet 1527 and into the extender 1525 where the molten material can redistribute and spread within the extender 1525 to obtain a wide profile including an even pressure within the extender 1525. The molten material can then flow from the extender inlet 1527 through the extender 1525 and out of the extender 1525 with an even flow density through the extender outlet 1528 to obtain a continuous, thin, elongated profile defined by the extender 1525. In some embodiments, rollers (not shown) can be provided at the extender outlet 1528 to draw the glass from the extender 1525 into a flexible glass ribbon. In addition, in some embodiments, any one or more features of the third object 1100 can be combined with any one or more features of the fourth object 1500 to provide another object formed by the methods of the disclosure.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is to be understood that, as used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Ranges can be expressed herein as from "about" one particular value, and/or to "about" another particular value. When such a range is expressed, embodiments include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A method of forming an object comprising:
   wrapping foil around a preform to provide a multi-layered structure comprising a plurality of layers of wrapped foil;
   diffusion bonding the plurality of layers and the preform together; and
   shaping the diffusion bonded multi-layered structure to form the object,
   wherein the object comprises an enclosure comprising two opposing walls that extend from an opening in a direction, wherein a width of each of the two opposing walls increases relative to the opening along the direction, and wherein a distance between the two opposing walls decreases along the direction to provide an elongated slot opposite the opening.

2. The method of claim 1, wherein diffusion bonding comprises a hot isostatic pressing process.

3. The method of claim 1, wherein the foil comprises a platinum or platinum alloy material.

4. The method of claim 1, wherein the preform comprises a refractory material.

5. The method of claim 4, wherein the refractory material comprises at least one of platinum, molybdenum, molybdenum alloys, alumina, zirconia, refractory oxides, and refractory nitrides.

6. The method of claim 1, wherein the preform comprises a mandrel.

7. The method of claim 6, wherein the mandrel comprises a hollow cylinder or a hollow prismatic shape.

8. The method of claim 1, wherein prior to shaping the multi-layered structure comprises an inner dimension and a wall thickness, wherein the inner dimension is based at least in part on an outer dimension of the preform, wherein the wall thickness is based at least in part on a thickness of the foil and the number of layers wrapped around the preform, and wherein the multi-layered structure comprises at least two sections each comprising a different wall thickness.

9. A method of forming an object comprising:
   wrapping foil around a preform to provide a multi-layered structure comprising a plurality of layers of wrapped foil;
   removing the preform from the multi-layered structure;
   diffusion bonding the plurality of layers together; and
   shaping the diffusion bonded multi-layered structure to form the object,
   wherein the object comprises an enclosure comprising two opposing walls that extend from an opening in a direction, wherein a width of each of the two opposing walls increases relative to the opening along the direction, and wherein a distance between the two opposing walls decreases along the direction to provide an elongated slot opposite the opening.

10. The method of claim 9, wherein diffusion bonding comprises a hot isostatic pressing process.

11. The method of claim 9, wherein the foil comprises a platinum or platinum alloy material.

12. The method of claim 9, wherein the preform comprises a mandrel.

13. The method of claim 12, wherein the mandrel comprises a hollow cylinder.

14. The method of claim 9, wherein prior to shaping the multi-layered structure comprises an inner dimension and a wall thickness, wherein the inner dimension is based at least in part on an outer dimension of the preform, wherein the wall thickness is based at least in part on a thickness of the foil and the number of layers wrapped around the preform, and wherein the multi-layered structure comprises at least two sections each comprising a different wall thickness.

15. A method of forming an object comprising:
   stacking a plurality of layers of foil to provide a multi-layered structure;
   diffusion bonding the plurality of layers together; and
   shaping the diffusion bonded multi-layered structure to form the object;
   wherein the object comprises an enclosure comprising two opposing walls that extend from an opening in a direction, wherein a width of each of the two opposing walls increases relative to the opening along the direction, and wherein a distance between the two opposing walls decreases along the direction to provide an elongated slot opposite the opening.

16. The method of claim 15, wherein diffusion bonding comprises a hot isostatic pressing process.

17. The method of claim 15, wherein the foil comprises a platinum or platinum alloy material.

18. The method of claim 15, comprising diffusion bonding a plurality of diffusion bonded multi-layered structures together prior to shaping.

19. The method of claim 15, comprising diffusion bonding another diffusion bonded multi-layered structure to the object.

20. The method of claim 15, further comprising attaching a tank to the elongated slot of the enclosure.

21. The method of claim 15, further comprising attaching an inlet of an extender to the elongated slot of the enclosure, wherein the extender comprises a hollow interior defining a rectangular wall extending from the inlet of the extender to an outlet of the extender.

22. The method of claim 15, wherein shaping further comprises shaping the diffusion bonded multi-layered structure around a preform to form the object.

23. The method of claim 22, wherein the preform comprises a mandrel.

24. The method of claim 23, wherein the mandrel comprises a hollow cylinder.

* * * * *

UNITED STATES PATENT AND TRADEMARK OFFICE
CERTIFICATE OF CORRECTION

PATENT NO. : 10,814,421 B2
APPLICATION NO. : 16/098487
DATED : October 27, 2020
INVENTOR(S) : Martin Herbert Goller et al.

Page 1 of 1

It is certified that error appears in the above-identified patent and that said Letters Patent is hereby corrected as shown below:

In the Claims

Column 16, Line 65, Claim 18, delete "claim 15," and insert -- claim 15, further --, therefor.

Column 17, Line 1, Claim 19, delete "claim 15," and insert -- claim 15, further --, therefor.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*